Patented Apr. 8, 1924.

1,489,741

UNITED STATES PATENT OFFICE.

AUGUSTUS E. CRAVER, OF CLIFFSIDE, NEW JERSEY, ASSIGNOR TO THE BARRETT COMPANY, A CORPORATION OF NEW JERSEY.

PROCESS OF PRODUCING PHTHALIC ANHYDRIDE.

No Drawing.   Application filed February 14, 1922.   Serial No. 536,514.

*To all whom it may concern:*

Be it known that I, AUGUSTUS E. CRAVER, a citizen of the United States, residing at Cliffside, in the county of Bergen and State of New Jersey, have invented certain new and useful Improvements in Processes of Producing Phthalic Anhydride, of which the following is a specification.

This invention relates to improvements in catalysts, particularly to catalysts which are capable of causing oxidation reactions, and to processes of oxidation wherein such catalysts are employed. It relates more specifically to the selective oxidation of naphthalene and has particular reference to the production of phthalic acid anhydride by the vapor phase oxidation of naphthalene in the presence of an oxygen-containing gas and a catalyst.

I am aware that the catalytic vapor phase oxidation of naphthalene to phthalic anhydride has been described before, but the following disclosure of my invention will make clear the improvements which I have effected in the composition of the catalyst over the previous processes.

In the U. S. Patent No. 1,285,117 a process is described which claims the use of vanadium oxides as the catalytic material. Mention is made in the specification of said patent to the effect that other materials may be mixed with the oxides of vanadium, such as magnesium oxide, alkaline earth oxides, other metallic oxides, asbestos, or inert materials, but no information is stated concerning the composition of these mixtures, the optimum proportions of ingredients, the optimum running conditions, or indicating that these mixed catalysts differ from the oxides of vanadium in their catalytic effect, or that they differ very widely among themselves.

In the British Patent No. 170,022 a process is described in which fused vanadium oxide is used as the catalyst for the oxidation of naphthalene to phthalic anhydride.

Also, in U. S. Patent No. 1,284,888 a process is described for the manufacture of phthalic anhydride, naphthoquinone and benzoic acid, which claims the use of molybdenum oxides as the catalytic material.

In the catalytic oxidation of naphthalene, the oxidation thereof may proceed according to the following equations.

(1) 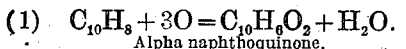
Alpha naphthoquinone.

(2) $C_{10}H_8 + 9O =$
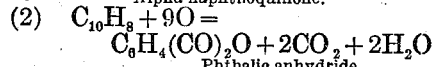
Phthalic anhydride.

(3) 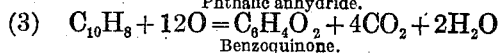
Benzoquinone.

(4) 
Maleic anhydride.

(5) 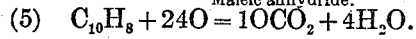

In my work, when optimum oxidizing conditions are employed (which conditions in many cases represented the practical limit as to catalyst temperature, time of contact, and proportion of air to naphthalene) in order to obtain the maximum efficiency from the various catalysts employed, the formation of naphthoquinone and benzoquinone is found to be quite small and in the majority of experiments was absolutely negligible. Therefore, only equations 2, 4 and 5 are to be considered in appraising the efficiency of a catalyst to be used for the commercial production of phthalic anhydride from naphthalene.

Depending on the catalyst employed, I have found the production of phthalic anhydride and maleic anhydride and the complete combustion of the naphthalene, the latter represented by equation (5)—see above—occurring in varying proportions.

It is obvious that reactions (4) and (5) are to be avoided if possible, or at least reduced to a minimum, as not only does the production of maleic acid or the complete combustion of naphthalene represent a loss of naphthalene, but it also complicates the recovery of phthalic anhydride and greatly increases the exotherm of the reaction, so that if the heat is not eliminated it will considerably augment the temperature of the catalyst and cause a still greater violence of the oxidation, which, depending on the catalyst employed, will give either more maleic acid or complete combustion or both. To those acquainted with processes of catalytic oxidation, it is a well known fact that satisfactory results can only be realized by maintaining a uniform temperature of the catalyst and especially is this true if a hydrocarbon air mixture be employed, in which the amount of available oxygen is considerably in excess of the theoretical requirement, which condition is highly desirable. This enormous increase in the exotherm, if the oxidation proceeds beyond the phthalic anhydride stage and the consequently increased difficulty of controlling the catalyst temperature at the desired and favorable temperature, can be better understood when the heat of reaction of equations (2), (4) and (5) are compared. For example, the heat liberated when one pound of naphthalene is converted completely into phthalic anhydride is only 6300 British thermal units, while if one pound of naphthalene is converted into maleic anhydride it is 12,700 and when it undergoes complete combustion, 17,300.

Therefore, a catalyst which will cause the major portion of the reaction to progress only to the phthalic anhydride stage is highly desirable as the heat liberated during the oxidation will be quite small, thus making the control of the catalyst relatively simple, and in addition will avoid the waste of naphthalene.

I have discovered that when naphthalene is vaporized in any convenient manner and is mixed with air in suitable proportions and finally passed over various oxides of individual metals at elevated temperatures, the catalytic action of the oxides of the various metals on naphthalene is widely different. Among the oxides which I have so investigated are those of vanadium, molybdenum, uranium, chromium, tungsten, iron, lead, aluminum, bismuth, and tantalum. These oxides were investigated with the object of obtaining their relative efficiencies for the commercial production of phthalic anhydride, and the practical limits of catalyst temperature, ratio of available oxygen to naphthalene, and time of contact had to be employed with some of the catalysts which gave low phthalic anhydride productions. It was found that only vanadium oxide gave an hourly production and a yield of phthalic anhydride which could be considered as commercially practicable. The remaining metallic oxides arranged themselves in two classes as follows:—

Class I, characterized by relatively low phthalic anhydride production and relatively low complete combustion, includes the oxides of molybdenum, tungsten, tantalum, aluminum and lead.

Class II, characterized by relatively low phthalic anhydride production and relatively high complete combustion, includes the oxides of uranium, bismuth, iron and chromium.

Vanadium oxide at about 400° C. catalyst temperature and with a ratio of air to naphthalene possessing about three times the theoretical oxygen requirement to form phthalic anhydride and a time of contact of the air-naphthalene mixture with the catalyst of 0.44 second gave phthalic anhydride, maleic acid and a measurable amount of the products of complete combustion, i. e., carbon dioxide and water, these products existing in the proportions of 4.3:1.0:1.5 respectively. Thus, I have found that when vanadium oxide is used under optimum running conditions from a commercial standpoint about 40% of the naphthalene that is passed through the catalyst undergoes complete combustion and conversion into maleic acid and represents therefore a 40% loss of naphthalene. The remaining 60% of naphthalene is converted into phthalic anhydride except for a small amount of unchanged naphthalene and naphthoquinone.

I have further found that varying the conditions of the oxidation does not seem to materially change this ratio of oxidation products although, of course, the percentage yield may change.

The phthalic anhydride production with all the metallic oxides enumerated above, other than vanadium oxide, was extremely small, being almost negligible, and was found incapable of any material augmentation by varying the conditions. In order to obtain an idea of the activities of these oxides I will give the results of experiments made with molybdenum oxide and uranium oxide, these two oxides being the most efficient phthalic anhydride forming catalysts in their respective classes. With molybdenum oxide at 550° C., a yield of about 6.0% of theory of phthalic anhydride was obtained with a complete combustion of about 10%, the remainder of the naphthalene passing through unchanged, except for a very small amount of naphthoquinone, the formation of maleic acid being negligible.

Uranium oxide, however, at 450° C. gave a yield of phthalic anhydride of 5% of theory, along with a 25% complete combustion, the remainder of the naphthalene passing through unchanged except for a small production of maleic acid and naphthaoquinone.

Thus of the single metallic oxides investigated, only vanadium oxide was found to give a phthalic anhydride production of a magnitude great enough to be considered from a commercial standpoint, but the accompanying large maleic acid formation and complete combustion are serious disadvantages, as they represent a loss of naphthalene and cause an unduly excessive heat of reaction, thus making it much more difficult to maintain a uniform catalyst temperature, which is absolutely essential for the success of the catalytic oxidation of naphthalene. Furthermore, the production of large accompanying amounts of maleic acid increases the difficulty of obtaining pure phthalic anhydride from the reaction products and also complicates the condensing system for condensing the reaction products, owing to the highly corrosive nature of maleic acid.

I have found, however, that very greatly augmented productions of phthalic anhydride with relatively very small maleic acid productions and complete combustions can be realized under conditions which are highly satisfactory commercially, if proper mixtures of the oxides of various metals are employed in preference to the oxides of the individual metals, and this constitutes the new and useful improvements in the composition of catalysts for the commercial production of phthalic anhydride, of which this is a specification.

I have investigated a large number of catalysts consisting of mixtures of various metallic oxides, including in the latter the oxides of vanadium, molybdenum, uranium, copper, cobalt, chromium, sodium, aluminum, manganese, tungsten, tantalum, titanium, cadmium, lead, iron and bismuth.

I have found, for example, that small amounts of manganese oxide, when admixed with vanadium oxide, very materially reduce the maleic acid formation and complete combustion of the naphthalene which occurs when vanadium oxide is used alone. For example, when a catalyst consisting of approximately 85% of vanadium oxide and 15% of manganese oxide, which proportions were found to be most satisfactory, was employed, only 20% of the naphthalene passed through the system was found to have undergone complete combustion and conversion into maleic acid, the production of which latter was relatively quite small, while the remaining 80% was converted into phthalic anhydride along with a very small production of alpha-naphthoquinone and with a very small amount of naphthalene passing through unaltered. Thus, by employing this mixed catalyst a very much smaller maleic acid production, a somewhat smaller complete combustion, and a relatively much larger phthalic anhydride production were obtained compared with those resulting when a catalyst consisting of vanadium oxide alone is employed. I have found, however, that a somewhat increased catalyst temperature must be employed with this mixed catalyst over that used for vanadium oxide, thus making it appear as though the catalytic action of vanadium oxide has been considerably depressed. The stopping of the bulk of the oxidation of naphthalene at the phthalic anhydride stage is perhaps also due to the fact that this mixed catalyst has decidedly less oxidizing action on the formed phthalic anhydride than has vanadium oxide. The relative amounts of the oxides may be varied somewhat, say from about 10% to 30% of manganese oxide while still obtaining considerable improvement over the result that would be obtained by using vanadium oxide alone as the catalyst.

In an investigation dealing with the stability of phthalic anhydride, in which a mixture of the latter and air was passed through a vanadium oxide catalyst under conditions approximating as closely as possible those existing during the catalysis I have found that phthalic anhydride undergoes considerable conversion into maleic acid and complete combustion. I have found, for example, that if a mixture of 8 parts of air and 1.0 part by weight of phthalic anhydride be passed through a vanadium oxide catalyst at 425° C. at a speed equivalent to a time of contact of the reacting mixture with the catalyst of 0.4 second, about 53% of the charged phthalic anhydride undergoes complete combustion and conversion into maleic acid. These results account for the large amount of maleic acid and complete combustion occurring when vanadium oxide is used as the catalyst.

Another very efficient mixed catalyst for the production of phthalic anhydride consists of a mixture of 35% molybdenum oxide and 65% vanadium oxide. With this mixture somewhat less than 25% of the naphthalene passing through the catalyst undergoes complete combustion and conversion into maleic acid. The remainder of the naphthalene is converted into phthalic anhydride except for a very small amount of naphthalene passing through unaltered. The proportions of molybdenum oxide to vanadium oxide may be varied from almost equal quantities of the two to about three or four times as much vanadium oxide as molybdenum oxide without departing from the scope of the invention.

Other mixed catalysts, which have been found to be more efficient and satisfactory than vanadium oxide are vanadium oxide uranium oxide mixtures with the vanadium oxide largely predominating and also vanadium oxide tungsten oxide mixtures containing about 20% of tungsten oxide.

I have also investigated a number of ternary mixtures and have found that even somewhat better results can be achieved. For example, the replacing of 5% of molybdenum oxide in the previously mentioned 65% vanadium oxide 35% molybdenum oxide mixture by means of manganese oxide or copper oxide, reduces still further the relative amounts of maleic acid production and complete combustion of the naphthalene.

Thus, by employing mixtures of the oxides of the metals mentioned previously and by adjusting the relative proportions of the component metallic oxides present, I have been able to obtain yields of phthalic anhydride far in excess of those procurable from these oxides when used singly, and in addition these yields were obtained under running conditions which are entirely satisfactory from the standpoint of the commercial production of phthalic anhydride. Furthermore, by the use of these mixed catalysts, I have been able to reduce the maleic acid formation to a very small, practically negligible amount, which when considered along with the greatly reduced complete combustion of the naphthalene, is seen to cause a material decrease in the exotherm of the reaction, thus enabling a more accurate and easy control of the catalyst temperature. The amount of naphthalene lost has thus been considerably reduced by employing these mixed catalysts. Furthermore, the greatly reduced maleic acid formation facilitates the separation and purification of the phthalic anhydride.

Investigation of other mixed catalysts consisting of the metallic oxides previously mentioned indicated that the oxides more basic than those occurring in the fifth and sixth groups, such as those of sodium, copper, lead, cobalt, aluminum, cadmium, etc., when mixed with vanadium oxide, tended to increase the relative amounts of maleic acid formation and complete combustion and to decrease the amount of phthalic anhydride formed.

It has been impossible to arrive at any definite explanation of the surprising influence which one oxide exerts on another oxide when both are intimately mixed with each other.

Although several mixed oxide catalysts have thus been described, it is the intention not to be limited to these specific examples, as many other mixtures containing the oxides previously mentioned, which I have investigated, can be prepared. In choosing these oxides to constitute the mixed catalyst, it is essential, however, that they all should catalyze the oxidation of naphthalene to phthalic anhydride.

In the preparation of these mixed catalysts, it is preferable that the component metallic oxides be in the most minutely divided condition possible and intimate contact with each other in order to secure the maximum advantage of the mixed catalyst.

The preparation of the catalyst can be accomplished by starting with a solution containing the salts of the metals, the oxides of which metals are desired in the finished catalyst and which metallic salts on ignition leave only the oxides of the metals, or it is also possible to use a water suspension of the oxides or hydroxides of the metals. However, I have achieved the most satisfactory results by employing a solution of the complex organic acid compounds of the metals, as described in my copending application, Serial No. 513,111. The carrier, which may consist of crushed pumice or other suitable powdered, granulated or fibrous material, which is chemically inert and acts merely as a mechanical distributor, may then be added to the prepared solution or water suspension of the metallic compounds and the whole evaporated to dryness while being stirred, after which it is ignited in air or other gases or in the presence of the naphthalene oxygen-containing gas mixture to be used in the catalysis and at the same temperature as that used in the oxidation.

My invention will be further explained in connection with the following example, which is given for illustrative purposes.

It is intended not to limit the procedure to the exact details given, as the process can be varied over wide limits, both in the choice of the conditions and also in the composition of the catalyst, without departing from the spirit and scope of the invention.

A mixture of approximately 10 parts of air to 1.0 part by weight of naphthalene vapor is passed through a catalyst consisting of crushed pumice impregnated with a mixture of 65% vanadium oxide and 35% of molybdenum oxide, held at a temperature of 450° C. and maintaining a time of contact between the reacting gases and the catalyst of about 0.36 second. It is preferable to introduce the catalyst or the carrier containing the same into tubes, containers or other confined space, through which the reacting gases are passed. The products of the reaction, together with the very small amount of unchanged naphthalene are then condensed and separated by any of the well known methods, either physical or chemical in nature.

If fractional condensation and separation of the reaction products be employed, it is possible to pass the exit gases containing the small amount of unchanged naphthalene, after being supplemented with additional naphthalene and enriched with oxygen or oxygen-containing gas, immediately into another converter similar to the first and arranged in series with the latter.

It will be evident that the various conditions of the reaction, as stated above, are capable of wide variation. Among these conditions may be mentioned the temperature and pressure at which the reaction is carried out, as for example, the reaction may be carried out at atmospheric pressure or at increased or diminished pressure; the time of contact of the reacting gases with the catalyst; the relative proportions of naphthalene to oxygen-containing gas, which may consist of air, oxygen, or ozone, or a mixture of any or all of these or other gases which contain free oxygen. These conditions are all more or less dependent on each other. Furthermore, much variation exists in the choice of the mixed catalyst in the relative amounts of oxides present, which in turn will necessitate variation or adjustment of the other conditions enumerated above in order to utilize to the greatest advantage the improvement in the composition of the catalyst which I have effected.

Instead of employing very pure naphthalene I have found that the gratifying results, which have been described herein for the mixed catalysts, can also be obtained with relatively impure naphthalene.

In the specification the words "maleic anhydride" and "maleic acid" and also the words "phthalic acid" and "phthalic anhydride" are considered synonymous.

I claim:—

1. The process of producing phthalic anhydride, which comprises passing naphthalene in the vapor phase and an oxygen-containing gas into contact with a catalyst comprising an oxide of vanadium and an oxide of another metal of the fifth and sixth periodic groups.

2. The process of producing phthalic anhydride, which comprises passing naphthalene in the vapor phase and an oxygen-containing gas into contact with a catalyst comprising an oxide of vanadium and an oxide of molybdenum.

3. The process of producing phthalic anhydride, which comprises passing naphthalene in the vapor phase and an oxygen-containing gas into contact with a catalyst comprising an oxide of vanadium and an oxide of molybdenum in substantially the proportions of 65 to 35 by weight.

4. The process of producing phthalic anhydride, which comprises passing naphthalene in the vapor phase and an oxygen-containing gas into contact with a catalyst comprising an oxide of vanadium and an oxide of molydenum in substantially the proportions of 65 to 35 by weight at a temperature of about 450° C.

5. The process of producing phthalic anhydride, which comprises passing naphthalene in the vapor phase and an oxygen-containing gas into contact with a catalyst comprising oxides of vanadium, tungsten and molybdenum.

6. The process of producing phthalic anhydride, which comprises passing naphthalene in the vapor phase and an oxygen-containing gas into contact with a catalyst comprising an oxide of vanadium and an oxide of a metal of the 6th periodic group.

In testimony whereof I affix my signature.

AUGUSTUS E. CRAVER.